(12) United States Patent
Leshchyshyn et al.

(10) Patent No.: US 8,387,699 B2
(45) Date of Patent: *Mar. 5, 2013

(54) GREEN COAL BED METHANE FRACTURING FLUID COMPOSITIONS, METHODS OF PREPARATION AND METHODS OF USE

(75) Inventors: Timothy Tyler Leshchyshyn, Calgary (CA); Peter William Beaton, Calgary (CA); Thomas Michael Coolen, Calgary (CA)

(73) Assignee: Calfrac Well Services Ltd., Calgary (CA)

( * ) Notice: Subject to any disclaimer, the term of this patent is extended or adjusted under 35 U.S.C. 154(b) by 465 days.

This patent is subject to a terminal disclaimer.

(21) Appl. No.: 12/509,544

(22) Filed: Jul. 27, 2009

(65) Prior Publication Data

US 2010/0044049 A1    Feb. 25, 2010

Related U.S. Application Data

(63) Continuation-in-part of application No. 12/207,731, filed on Sep. 10, 2008, now abandoned.

(51) Int. Cl.
    *E21B 43/267*    (2006.01)
(52) U.S. Cl. .................. 166/308.3; 166/280.1
(58) Field of Classification Search ............ None
    See application file for complete search history.

(56) References Cited

U.S. PATENT DOCUMENTS

| | | | |
|---|---|---|---|
| 3,990,978 A | 11/1976 | Hill | |
| 4,265,311 A | 5/1981 | Ely | |
| 4,627,495 A | 12/1986 | Harris et al. | |
| 5,310,002 A | 5/1994 | Blauch et al. | |
| 5,562,160 A | 10/1996 | Brannon et al. | |
| 6,138,760 A * | 10/2000 | Lopez et al. | 166/300 |
| 6,159,907 A | 12/2000 | Van Slyke | |
| 6,255,256 B1 | 7/2001 | Van Slyke | |
| 6,582,819 B2 | 6/2003 | McDaniel et al. | |
| 6,620,769 B1 | 9/2003 | Juppe et al. | |
| 6,838,418 B2 | 1/2005 | Allan et al. | |
| 6,844,297 B2 | 1/2005 | Allan et al. | |
| 7,078,370 B2 | 7/2006 | Crews | |
| 7,231,976 B2 | 6/2007 | Berry et al. | |
| 7,261,158 B2 | 8/2007 | Middaugh et al. | |
| 7,304,019 B2 | 12/2007 | Lin et al. | |

(Continued)

FOREIGN PATENT DOCUMENTS

| | | |
|---|---|---|
| CA | 2234546 | 6/1997 |
| CA | 2357973 | 4/2002 |

(Continued)

OTHER PUBLICATIONS

Canadian Intellectual Property Office (CIPO), Non-Final Office Action in CA Appln. No. 2,671,204, Nov. 6, 2009.
U.S. Appl. No. 12/457,559—Aug. 3, 2011 PTO Office Action.
U.S. Appl. No. 12/458,763—Sep. 26, 2011 PTO Office Action.

*Primary Examiner* — Zakiya W Bates
(74) *Attorney, Agent, or Firm* — Davidson Berquist Jackson & Gowdey, LLP (57) ABSTRACT

Coal friendly, non-toxic, green fracturing compositions, methods of preparing fracturing compositions and methods of use in various fracturing applications are described. The compositions are characterized as non-toxic compositions enabling effective use of the fracturing compositions in coal bed methane (CBM) formations and particularly shallow CBM formations. The compositions include a liquid component (water-based component) and a gas component in proportions that can support a proppant under turbulent conditions and that promote the formation of a mist.

22 Claims, 5 Drawing Sheets

U.S. PATENT DOCUMENTS

| | | |
|---|---|---|
| 7,306,041 B2 | 12/2007 | Milne et al. |
| 7,377,721 B2 | 5/2008 | Patel |
| 7,392,844 B2 | 7/2008 | Berry et al. |
| 7,741,252 B2 | 6/2010 | Chen et al. |
| 8,288,324 B2 | 10/2012 | Sunkara |
| 2002/0160921 A1 | 10/2002 | Taylor et al. |
| 2004/0018943 A1 | 1/2004 | Pyecroft et al. |
| 2004/0159433 A1* | 8/2004 | England et al. ............ 166/308.2 |
| 2005/0065041 A1 | 3/2005 | Hill |
| 2007/0023184 A1 | 2/2007 | Jackson et al. |
| 2007/0204991 A1 | 9/2007 | Loree et al. |
| 2008/0051301 A1 | 2/2008 | Chen et al. |
| 2008/0261836 A1 | 10/2008 | Filler et al. |
| 2008/0271891 A1 | 11/2008 | Hutchins et al. |
| 2010/0044049 A1 | 2/2010 | Leshchyshyn et al. |

FOREIGN PATENT DOCUMENTS

| | | |
|---|---|---|
| CA | 2576075 | 2/2008 |
| EP | 1236863 | 9/2002 |
| WO | WO 97/21022 | 6/1997 |
| WO | WO 2006/017623 A | 2/2006 |

* cited by examiner

GREEN COAL BED METHANE FRACTURING FLUID COMPOSITIONS, METHODS OF PREPARATION AND METHODS OF USE

RELATED APPLICATIONS

This application is a continuation-in-part of U.S. patent application Ser. No. 12/207,731 filed Sep. 10, 2008, and this application claims priority to Canadian Patent Application No. 2,635,989 filed Jul. 25, 2008, the entire contents of each of which are fully incorporated herein by reference for all purposes. This application is related to U.S. application Ser. No. 12/457,559, filed Jun. 16, 2000, and to U.S. application Ser. No. 12/458,763, filed Jul. 22, 2009, the entire contents of each which are fully incorporated herein by reference for all purposes

FIELD OF THE INVENTION

The invention describes coal friendly, non-toxic, green fracturing compositions, methods of preparing fracturing compositions and methods of use, in various applications. In addition, the subject invention overcomes problems in the use of mists as an effective fracturing composition particularly having regard to the ability of a mist to transport an effective volume of proppant into a formation. As a result, the subject technologies provide effective economic, coal friendly and environmentally friendly solutions to using high ratio gas fracturing compositions that can be produced in a continuous (i.e. non-batch) process without the attendant capital and operating costs of current pure gas fracturing equipment.

BACKGROUND OF THE INVENTION

As is well known in the hydrocarbon industry, many wells require "stimulation" in order to promote the recovery of methane from the coal bed methane (CBM) production zone of the well. CBM is also known as NGC (natural gas from coal), CBG (coal bed gas) and CSM (coal seam methane).

One of these stimulation techniques is known as "fracturing" in which a fracturing fluid composition is pumped under high pressure into the well together with a proppant such that new fractures are created and passageways within the CBM production zone are held open with the proppant. Upon relaxation of pressure, the combination of the new fractures and proppant having been forced into those fractures increases the ability of methane to flow to the wellbore from the CBM production zone.

There are a significant number of fracturing techniques and fluid/proppant compositions that promote the formation of fractures in the CBM production zone and the delivery of proppants within those fractures. The most commonly employed methodologies seek to create and utilize fracturing fluid compositions having a high viscosity that can support proppant materials so that the proppant materials can be effectively carried within the fracturing fluid. In other words, a viscous fluid will support a proppant within the fluid in order that the proppant can be carried a greater distance within the fracture, or in some circumstances, carried at all. In addition, fracturing fluids are commonly designed such that upon relaxation of viscosity (or other techniques) and over time (typically 90 minutes or so), the fluid viscosity drops and the proppant is "dropped" in the formation and the supporting fluid flows back to the wellbore. The proppant, when positioned in the fracture seeks to improve the permeability of the CBM production zone in order that methane will more readily flow to the well. An effective fracturing operation can increase the flow rate of methane to the well by at least one order of magnitude. Many wells won't produce long term in an economic manner without being stimulated by methods such as fracturing.

Fracturing fluid compositions are generally characterized by the primary constituents within the composition. The most commonly used fracturing fluids are water-based or hydrocarbon-based fluids, defined on the basis of water or a hydrocarbon being the primary constituent of the specific composition. Each fracturing fluid composition is generally chosen on the basis of the subterranean formation characteristics and economics. In general, a production zone that produces in situ formation water is usually economically stimulated with a water-based system. For CBM formations, which are commonly water producing before they produce methane, an economic water-based fluid is a common choice whereas hydrocarbon based fluids are not used very often.

In the case of water-based fluids, in order to increase the viscosity of water, various "viscosifying" additives may be added to the water-based fluid at the surface such that the viscosity of the water-based fluid is substantially increased thereby enabling it to support proppant. As is known, these water-based fluids may include other additives such as alcohols, KCl and/or other additives to impart various properties to the fluid as known to those skilled in the art. The most commonly used viscosifying additives are polymeric sugars that are used to create linear gels having moderate viscosities. These linear gels may be further combined with cross-linking agents that will create cross-linked gels having high viscosities.

CBM formations generally naturally fracture with a primary set of natural fractures (face cleats) located perpendicular to a secondary set of natural fractures (butt cleats). In the past 20 years, many CBM wells were stimulated with cross-linked water-based fracturing fluids and foam fracturing fluids. However currently, unconventional reservoirs, including CBM formations, are generally pumped with low viscosity fluids such as slick (friction reduced) water and nitrified (up to 53% quality) slick water fracture compositions. Where traditional high viscosity fluids typically encourage a bi-wing fracture (two single fractures extending out from opposing sides of the well bore) by plugging secondary (usually orthogonal) fractures, low viscosity fluids generally are less likely to plug secondary fractures, thus forming a wide intersecting fracture network instead.

In the case of CBM production zones, there are generally two basic types: dry CBM production zones and wet (water containing) CBM production zones. In both cases, methane typically exists in two possible forms within the production zone. The first form is a free gas (gaseous state) where methane gas exists in the porosity of the formation, which is mostly in the natural fractures. The second form of methane is adsorbed onto the surface of the coal in equilibrium with reservoir pressure. If reservoir pressure increases, more free gas adsorbs onto the coal surface. If reservoir pressure decreases, more methane desorbs off of the coal surface to become free gas.

Stimulating production of a CBM production zone generally depends on the basic type of production zone (dry or water containing). If the CBM production zone is dry, the methane will generally desorb off the coal surfaces and flow to the well as a gas if the pressure of the well is lowered through well operations at the surface. If the CBM production zone is water containing, the reservoir pressure generally needs to be reduced through a process called dewatering. Dewatering is a well operation where water is pumped from the well to reduce pressure in the reservoir until methane starts to desorb off of the coal surface. As more water is removed from the reservoir, more methane desorbs from the coal surfaces at a faster rate. This process typically continues until poor economics of the well develop, due in part to eventually declining rates of methane production. Dewatering rates traditionally have been high, in the order of 30 m$^3$/day, where current dewatering rates can be limited to maximum as low as 3 m$^3$/day to maintain created and natural fracture permeability by not causing fractures to close.

During a typical fracturing operation, the fracturing fluid (without any proppant) is initially pumped into the well at a sufficiently high pressure and flow rate to fracture the formation, or in the case of CBM formations, to also dilate and/or re-open pre-existing natural fractures. After fracturing has been initiated, a proppant is generally added to the fracturing fluid, and the combined fracturing fluid and proppant is forced into the fractures in the CBM production zone. When pressure is released and over time (typically 90 minutes), the viscosity of the fracturing fluid drops such that the proppant separates or drops out of the fracturing fluid within the formation, and the "de-viscosified" fracturing fluid flows back to the well where it is removed.

One major problem in this type of fracturing is the large volumes of water required and the attendant issues relating to the disposal of the water that has been pumped downhole and ultimately recovered from the well as a coal particle or otherwise contaminated fluid. Naturally fractured formations in the past few years have responded quite well to slick water based fractures, however, these types of fractures can use extremely high volumes of water, generally 2 to 3 orders of magnitude higher than traditional fracturing methods in CBM production zones. For example, where a normally sized foam frac typically used 30 m$^3$ of water in a CBM well 10 years ago, a slick water fracture with current technology can require 3,000 m$^3$ of water. In the case that the well has a dry CBM production zone, often having very low reservoir pressures, injecting extremely large volumes of water can counteract the benefit of forming a wide intersecting fracture network. In the case that the well has a wet CBM production zone, some current dewatering practices have rates that can be as low as 3 m$^3$/day and that can extend the lengths of time by months or years for steady methane production due to adding a large volume of fracturing water to the large volumes of reservoir water that already needs to be removed. As a result, in some cases the industry has required a reduction in water use while still maintaining a wide network of fractures by moving away from pure water-based fracturing fluids in favor of those technologies that utilize a high proportion of gas (usually nitrogen or supercritical carbon dioxide) as the fracturing fluid.

Generally, the use of a high proportion of gas in a fracturing fluid has several advantages, including minimized formation damage, reduced fluid supply costs and reduced disposal costs of fluid recovered from the well. For example, whereas water may increase the time required to dewater a CBM production zone to start flowing significant amounts of methane, high gas compositions may minimize such effects and will otherwise migrate from the formation more readily, and encourage larger amounts of fracturing water to flow back immediately after the fracturing operations. Gas injected and thus recovered from a well can simply be released to the atmosphere thereby obviating the need for decontamination and disposal of a substantial proportion of the materials recovered from the well.

With high ratio gas fracturing compositions, the characteristics of the compositions can be similarly controlled or affected by the use of additives. Generally, gas fracturing compositions can be characterized as a pure gas fracturing composition (typically a fluid comprising around 100% $CO_2$ or nitrogen) or energized, foamed and emulsied fluids (typically a fracturing composition comprising less than about 85% $CO_2$ or nitrogen by volume).

A pure 100% gas fracturing composition will have minimal viscosity and instead will rely on high turbulence to transport proppant as it is pumped into the CBM production zone. Unfortunately, while such techniques are effective in limited batch operations, the need for expensive, highly specialized, pressurized pumping, mixing and containment equipment substantially increases the cost of an effective fracturing operation. For example, a fracturing operation that can only utilize a batch process is generally limited in size to the volumetric capacity of a single pumping and containment unit. As it is economically impractical to employ multiple units at a single fracturing operation, the result is that very high volume gas fracturing operations can only be effectively employed in relatively limited circumstances. For example, a pure gas fracturing operation would typically be limited to pumping 300-32,000 kg of sand (proppant) into a well and is limited to the type of proppant that can be used in some circumstances. Common 100% gas fracturing compositions, such as liquid carbon dioxide or gelled propane, are inherently not preferred for CBM wells due to the chemical adsorption, methane desorption interference or damage that can occur on the surfaces of the coal to affect the long term production ability of the CBM production zone.

In the case of some shallow, dry and severely under-pressured CBM production zones, the reservoir often has high permeability, often due to being naturally fractured. During the drilling, casing and cementing process, the CBM production zone may be damaged or plugged such that perforations alone can't adequately communicate the well with the reservoir. A pure gas fracturing technique without proppant may be used to break through the damaged area and/or unplug the blocked area that prevents the methane flowing into the well from the CBM production zone. For example, high rate nitrogen is injected into a shallow coal bed methane CBM production zone at a rate of 1000 to 1500 scm/min for a volume of 3000 to 5000 scm (just a few minutes total operation) to unplug the damage and allow the CBM production zone to flow into the well. Due to economical requirements, comingling CBM production with conventional production from normally pressured sandstone or other lithologies is required. In the case that these conventional production zones are stimulated with proppant and fluids, as is often practiced, cross-flow can occur where gases and fluids from any one production zone may flow into any other production zone due to reservoir pressure differences either in a short time or long time after the stimulation. Where the conventional zones commonly have higher pressures than the under-pressured coal zones, there are inherently higher risks. Often it is desired that the fracturing compositions and methods used in the conventional zones be chemically compatible and prevent damage to the CBM zones if they are exposed or otherwise meet any environmental and non-toxic requirements.

In the case of some shallow, dry and severely under-pressured CBM production zones, the reservoir may have lower permeability than economically acceptable if high rate nitrogen stimulations are performed. In the case of most lower permeability production zones, a proppant fracture creating highly permeable paths for methane to flow to the well from the reservoir is required. Due to the low reservoir pressure, any normal amount of fracturing fluid may hydrostatically cause a water block which could prevent methane production as the reservoir pressure would be increased as well as a second phase being introduced to a pure gas system causing relative permeability reduction effects to methane flow.

The use of non-energized, energized, foamed and emulsied fluids for fracturing are generally not limited to batch operations as fluid mixing and pumping equipment for such fluids is generally not at the same scale in terms of the complexity and cost of equipment that is required for pure gas operations. In other words, the mixing and pumping equipment for a non-energized/energized/foamed/emulsied fluid fracturing operation is substantially less expensive and importantly, can produce effectively large continuous volumes of fracturing fluid mixed with proppant. That is, while a 100% gas fracturing operation may be able to deliver up to 32,000 kg of proppant to a formation, a non-energized/energized/foamed/emulsied fluid fracturing operation may be able to deliver in excess of 10 times that amount.

The characteristics of energized, foamed and emulsied fluids are briefly outlined below as known to those skilled in the art.

An energized fluid will generally have less than 53% (volume %) gas together with a conventional gelled water phase. An energized fluid is further characterized by a continuous fluid phase with gas bubbles that are not concentrated enough to interact with each other to increase viscosity. For example, the overall viscosity of an energized fluid comprised of a linear gel and nitrogen gas may be in the range of 20 cP which is a "mid-point" between the viscosity of a typical linear-gel water phase (30 cP) and a nitrogen gas phase (0.01 cP). For a cross-linked gel, the viscosity range may be 150-1000 cP (typically 100-800 cP when mixed with gas). However, in the case of high viscosity fluids, such as cross-linked gel, the desired wide fracturing network is not as likely to occur during fracturing, and in most cases the cross-linking agent is toxic. As is known, and in the context of this description, viscosity values measured in centipoise (cP) are dependent on shear rate. In this specification, all viscosity values are referenced to a shear rate of 170 sec$^{-1}$.

Foams will generally have greater than 53 vol % gas but less than about 85 vol % gas with the remainder being a gelled water phase. Foams are characterized as having a continuous fluid film between adjacent gas bubbles where the gas bubbles are concentrated enough to interact with each other to increase viscosity. Foams require the addition of foaming agents that promote stability of the gas bubbles. The viscosity of a foam will typically be in the range of 200-300 cP which may be 10 times greater than the viscosity of the gelled water phase (20-30 cP) and many times greater than the viscosity of the gas phase (0.01-0.1 cP). However, the greater viscosities may decrease the desired effect of forming a wide intersecting fracture network relative to lower viscosity systems absent of foamer. As known to those skilled in the art, most foaming agents will interfere or otherwise have a damaging effect with respect to the desorption process of methane from the coal faces in the production zone. In addition, most foaming agents do not pass relevant toxicity tests.

A carbon-dioxide emulsion, also known as a carbon-dioxide foam, is where the internal phase is a carbon-dioxide supercritical fluid and is characterized by having a second liquid film (i.e. the water-based phase) between adjacent liquid droplets. Emulsions will generally form when the supercritical fluid concentration is greater than 53 vol % and less than about 85 vol %. Emulsions require the addition of foaming agents to promote stability. The viscosity of an emulsion may also be 10 times greater than the individual viscosities of the separate gelled water phase and supercritical gas phase. Again, the higher viscosity emulsion will discourage the creation of wide intersecting fracture networks, which is desired in unconventional reservoirs. Furthermore, 100% carbon dioxide gas phases may damage CBM production zones by preferentially adsorbing on coal faces compared to methane such that permeability decreases (may be up to a 4 fold decrease) due to swelling decreasing the porosity and openness of the natural fractures.

Finally, when the gas concentration is increased above about 85% (typically 90-97%), the stability of a typical emulsion or a foam will decrease, such that the emulsion or foam will "flip" such that the gas phase becomes continuous, and the water phase is dispersed with the gas phase as small droplets or in larger slugs. This is commonly referred to as a "mist". The viscosity of a mist will generally revert to a "mid-point" of viscosity close to that of the gas (i.e. approximately 1-3 orders of magnitude lower than that of an emulsion) with the result being that the ability to support proppant based on viscosity is lost. As a result, fracturing compositions generally avoid the formation of mists and instead favor stabilizing foams and otherwise maximizing viscosities.

However, the tendency of developing a wide intersecting fracture network may increase when using a mist, while the volume of water needed is drastically reduced, and therefore less total potentially toxic materials are required to be added to the fracturing water to be injected into the production zone as the range of permeation may be greater.

Fracturing fluid compositions are inherently "toxic" as result of their make-up and specifically as a result of constituent compounds such as cross-linking agents, viscosifying additives, and any number of low cost additives of various functions that make up a fracturing fluid composition. As a result, there is a significant concern in the event of the fluids coming into contact with groundwater in either a short or longer time frame, and the associated concern that any contaminated fluids would be subsequently consumed by humans or animals. The deepest depth that easily processed and consumable groundwater is found is referred to as the base of ground water in which all deeper sources are saline and thus not fit for human or animal consumption. In CBM production zones, the water contained may either be fresh or saline.

When a fracturing operation is conducted in deep wells (i.e. generally greater than 200 m depth or below the base of groundwater regulations and protection), the toxicity is generally not an issue as the fracturing fluid is diluted by virtue of the migration distance to the groundwater as well as the low vertical permeability and ability of the fracturing fluid to migrate vertically at all through the matrix production zones, including CBM zones, due to cap rocks.

In the case of many shallow formations, operational economics are achieved by completing and stimulating multiple non-economic dry CBM production zones to form a marginal to good overall economic well with commingled production from all CBM zones. All zones could be stimulated at once by injecting down the well through casing only, but coiled tubing is often used to isolate the stimulation of individual zones with the flow back of the fracturing fluids commingled up the casing. When commingled deep (>200 m deep or deeper than base of groundwater) and shallow (<200 m deep or shallower than base of groundwater) CBM production zones are cleaned up and produced together up the casing, fracturing fluids can flow from any one CBM production zone out of the well or into another CBM production zone temporarily based on simple pressure differential. The result is that all CBM production zones in the well are at risk for being exposed to all fracturing fluids pumped into all CBM production zones. This effect, although not usually directly measured in the commingled stimulated well, can be risk assessed through regional bottom hole pressure measurements from offset wells with the same production zones to establish typical reservoir pressures.

However, in shallow wells, toxicity can be a significant problem as the fracturing operation may be conducted in relatively close proximity to groundwater such that the groundwater can be contaminated. For example, in Alberta, Canada, there has been a recent trend to develop shallow gas (commonly CBM) reservoirs less than 200 meters deep (or otherwise above the base of groundwater) using high fracture volumes, pump rates and pressures during such shallow fracturing operations.

In response to these concerns, regulatory agencies such as the Energy Resources Conservation Board (ERCB) (Alberta, Canada) are developing regulations to address these trends to ensure that the effects of these trends do not result in environmental contamination at or away from the well. For example, these regulations are considering imposing on companies conducting fracturing operations some or all of the following, including an effective assessment demonstrating that a complete review was conducted and all potential impacts were mitigated in the designed fracture program. Such an assessment is suggested to include the fracturing program design, including proposed pumping rates, volumes, pressures, and fluids; a determination of the maximum propagation expected for all fracture treatments to be conducted; identification and depth of offset oilfield and water wells within 200 m of the proposed shallow fracturing operations; verification of cement integrity through available public data of all oilfield wells within a 200 m radius of the well to be fractured; and landholder notification of water wells within 200 m of the proposed fracturing operations. These particular policies were introduced during recent times due to the high level of development of shallow, dry CBM wells that are drilled very close to one another.

Other conditions include restrictions for fracturing near a water well, in proximity to bedrock and limitations concerning pumping volumes during a nitrogen fracture. In particular, the use of non-toxic fracture fluids is required. This applies to many of the shallow, dry CBM wells.

In general, "green" or otherwise non-toxic, environmentally friendly fracturing compositions are preferred by society and regulatory agencies from industry. With any well operations including fracturing, there are small environmental risks from surface handling of materials before injection into the well or from recovering the fluids from the well after the frac. In general, preferences and requirements for the fracturing industry are requesting and in the future will require more non-toxic, green or environmentally friendly products. Society and government are particularly demanding when the perception that fresh water sources are at risk through well injection or during times of drought. Moreover, nitrogen condensed from the atmosphere that can be substituted for fresh water to inject into coal wells, reduces demand for fresh water sources leaving them for domestic use. The greater amount that inert nitrogen can be substituted for fresh water use, the more preferential the fracturing composition in turns of its effect on the environment.

The "toxicity" of many fluids is quantified by various protocols acceptable to a jurisdiction for testing the toxicity of a composition in the environment. Different areas or applications may use different protocols. For example, the Environmental Protection Agency (EPA) utilizes different testing protocols for testing soil contamination in different applications.

One set of standards that is generally accepted as a rigorous and meaningful test is the Microtox™ testing protocols for testing the toxicity of compositions in soil. Under the Microtox™ protocols, the viability of known bacterial cultures is measured within a sample to produce a numeric result as well as a "pass/fail" indication.

More specifically, the Microtox™ test is based on monitoring changes in the level of light emission from a marine bioluminescent bacterium, Vibrio fischeri NRRL-B-11177, when challenged with a toxic substance or sample containing toxic materials.

The test is performed by rehydrating freeze dried cultures of the organism, supplied as the Microtox™ reagent and determining the initial light output of homogenized bacterial suspensions. Aliquots of osmotically adjusted sample and sample dilutions are added to the bacterial suspension, and light measurements are made at specific intervals (generally at 5 or 15 minutes) after exposure to test samples. The diluent control (blank) is used to correct time-dependant change in light output.

The Microtox™ test endpoint is measured as the effective or inhibitory concentration of a test sample that reduces light emission by a specific amount under defined conditions of time and temperature. Normally, this is expressed as an EC50 (15) or IC50(15) which is the effective concentration or inhibitory concentration of a sample that reduces light emission of the test organism by 50% over a 15 minute test period at 15°C.

The EC50 or IC50 is calculated by log linear plotting of Concentration (C) vs percent Light Decrease (percent A), or more precisely by plotting Gamma Q (which is the corrected ratio of the amount of light lost to the amount of light remaining) versus Concentration on a log-log graph. Either a hand calculator or computer program data reduction systems may be used to calculate Gamma and the corresponding EC50 or IC50 values.

As noted above, CBM production zones are unique in how they store and release methane gas, and, in turn, CBM has unique damage mechanisms. Production of methane from CBM wells is a growing unconventional contribution to the gas supply for North America. Further, CBM is damaged by many gelling agents, clay control agents, surfactants, breakers, cross-linking agents, and other chemicals. The chemical damage generally causes a reduction in the rate that methane can desorb from coal. Some gases like liquid carbon dioxide and potentially propane can adsorb onto coal to such a large extent that the coal swells and causes a permeability reduction through reduction of natural fracture porosity and cross-sectional flow area.

Accordingly, there has been a need for the development of non-toxic fracturing fluid compositions that will meet acceptable standards for "non-toxicity" and that generally address the increasing needs for environmentally friendly, green consumable materials used by many industries. There has also been a need to use CBM friendly chemistry that reduces coal damage and otherwise maximizes production. In addition, there are society and government issues to reduce fresh water use, which is addressed by this invention by substituting water with inert nitrogen gas.

SUMMARY OF THE INVENTION

In accordance with the invention, there is provided fracturing fluid compositions for use in fracturing a coal bed methane (CBM) formation and methods of preparing and using such compositions for fracturing a well.

In its broadest form, the fracturing fluid compositions for use in fracturing a CBM formation comprise: a non-toxic and CBM friendly liquid component for temporarily supporting a proppant within the liquid component at surface, the liquid component including a viscosified water component having a viscosifier, the viscosified liquid component having a viscosity sufficient to temporarily support proppant admixed within the viscosified water component; and a breaker for relaxing the viscosity of the viscosified water component within a pre-determined period wherein the non-toxic liquid component passes toxicity testing.

In another aspect of the invention, in its broadest form, the invention provides a method of fracturing a CBM formation from a well comprising the steps of:
a) preparing a non-toxic and coal bed methane friendly liquid component at surface in a blender, the liquid component including:
  i. a viscosified water component having a viscosity sufficient to temporarily support proppant admixed within the viscosified water component; and
  ii. a breaker for relaxing the viscosity of the viscosified water component within a pre-determined period;
b) mixing the proppant into the liquid component in the blender;
c) introducing the proppant/liquid component into a high pressure pump and increasing the pressure to well pressure;
d) introducing a gas component into the high pressure pump and increasing the pressure to well pressure
e) mix the gas component with the proppant/liquid component under high turbulence conditions; and
f) pumping the combined gas and fluid from step e) at a high rate down the well
wherein the non-toxic liquid component passes toxicity testing.

The toxicity testing for the fracturing fluid composition is preferably a Microtox™ test, and more specifically a EC50 test.

In further embodiments, the viscosifier is any one of or a combination of hydroxyethyl cellulose (HEC), PAC (poly anionic cellulose) or a derivative thereof.

In yet another embodiment, the breaker is an enzyme breaker, preferably hemicellulase enzyme.

In various embodiments, the water component of the fracturing fluid composition contains saline water and/or fresh water, wherein the saline and/or freshwater is from a dewatering process.

For both the compositions and methods, the predetermined period is preferably less than 30 minutes and more preferably less than 10 minutes. In various embodiments, the viscosity is relaxed to less than 10 cP.

The fracturing fluid composition may further comprise a clay control agent, wherein the clay control agent is non-toxic coal bed methane friendly. In a further embodiment, the clay control agent is diallyl dimethyl ammonium chloride.

In further embodiments, the liquid component of the fracturing fluid composition further comprises less than 1 vol % buffer. Preferably the buffer is an organic acid, and in a further embodiment the buffer is formic acid.

In yet another embodiment, the fracturing fluid composition further comprises less than 1 vol % clay control agent, wherein the clay control agent is diallyl dimethyl ammonium chloride. In a further embodiment, the method further comprises the step of mixing the clay control agent with the viscosified liquid component.

In further embodiments, the fracturing fluid composition includes a proppant admixed within the viscosified water component.

The fracturing fluid composition may further comprise a gas component admixed with the liquid component under high turbulence conditions sufficient to support the proppant within a combined liquid component/gas component mixture wherein the combined liquid component/gas component mixture is characterized as a mist or liquid slug. It is preferred that the gas component is carbon dioxide, nitrogen, or a mixture of carbon dioxide and nitrogen.

In various embodiments, the combined fluid/gas component mixture is 3-15 vol % liquid component and 85-97 vol % gas component exclusive of the proppant.

In other embodiments, the initial viscosity of the liquid component is 15-100 centipoise (cP) at 170 $sec^{-1}$ prior to mixing with proppant or gas component and/or the mass of proppant is 0.25-5.0 times the mass of the liquid component. In a preferred embodiment, the mass of proppant is 1.0-2.5 times the mass of the liquid component.

In various embodiments, the viscosified water component includes 0.1-2.0 wt % gelling agent. In preferred embodiments, hydroxyethyl cellulose or a derivative thereof is the gelling agent. In a further embodiment, the gelling agent is PAC (poly anionic cellulose) or a derivative thereof.

In yet another embodiment, the liquid component is prepared in step a) of the method by mixing the gelling agent and liquid component in a hydration unit.

In another embodiment, the breaker is preferably hemicellulase enzyme.

In a further embodiment, the combined gas and fluid in step f) of the method is characterized as a mist or slug at the formation.

In yet another embodiment, the proppant is partially supported within the liquid component at surface by turbulence.

In yet another embodiment, the process of fracturing is continuous.

In a further embodiment, the well injection of high ratio proppant slurry is preceded by a 100% gas pad.

BRIEF DESCRIPTION OF THE FIGURES

The invention is described with reference to the accompanying figures in which.

DETAILED DESCRIPTION

Overview

With reference to the accompanying figures, "green", CBM fracturing compositions, methods of preparing green CBM fracturing compositions and methods of use in various applications and particularly in shallow formations are described. In addition, the subject invention overcomes problems in the use of mists as an effective fracturing composition particularly having regard to the ability of a mist to transport an effective volume of proppant into a formation. As a result, the subject technologies provide effective economic, CBM friendly and environmentally friendly solutions to using high ratio gas fracturing compositions that can be produced in a continuous (i.e. non-batch) process without the attendant capital and operating costs of current pure gas fracturing equipment.

Generally, compositions prepared in accordance with the invention include a liquid component (water-based component) and a gas component in proportions that promote the formation of a mist. In the context of this description reference to a gas component refers to a compound that is a gas at standard temperature and pressure (273 K and 100 kPa) such as nitrogen, carbon dioxide, propane, methane or other gases that are used in fracturing. Such compounds may in the context of the invention be in a supercritical state at various times during a fracturing process. Accordingly, it is understood that while such compounds may be referred to as a "gas", they may be exhibiting other properties such as those of liquids or supercritical fluids. For CBM fracturing compositions, nitrogen and nitrogen/carbon dioxide mixtures are preferred.

More specifically, the present compositions include a 3-15% liquid component (typically about 5%) and an 85-97% gas component (typically about 95%).

Figure 1A:
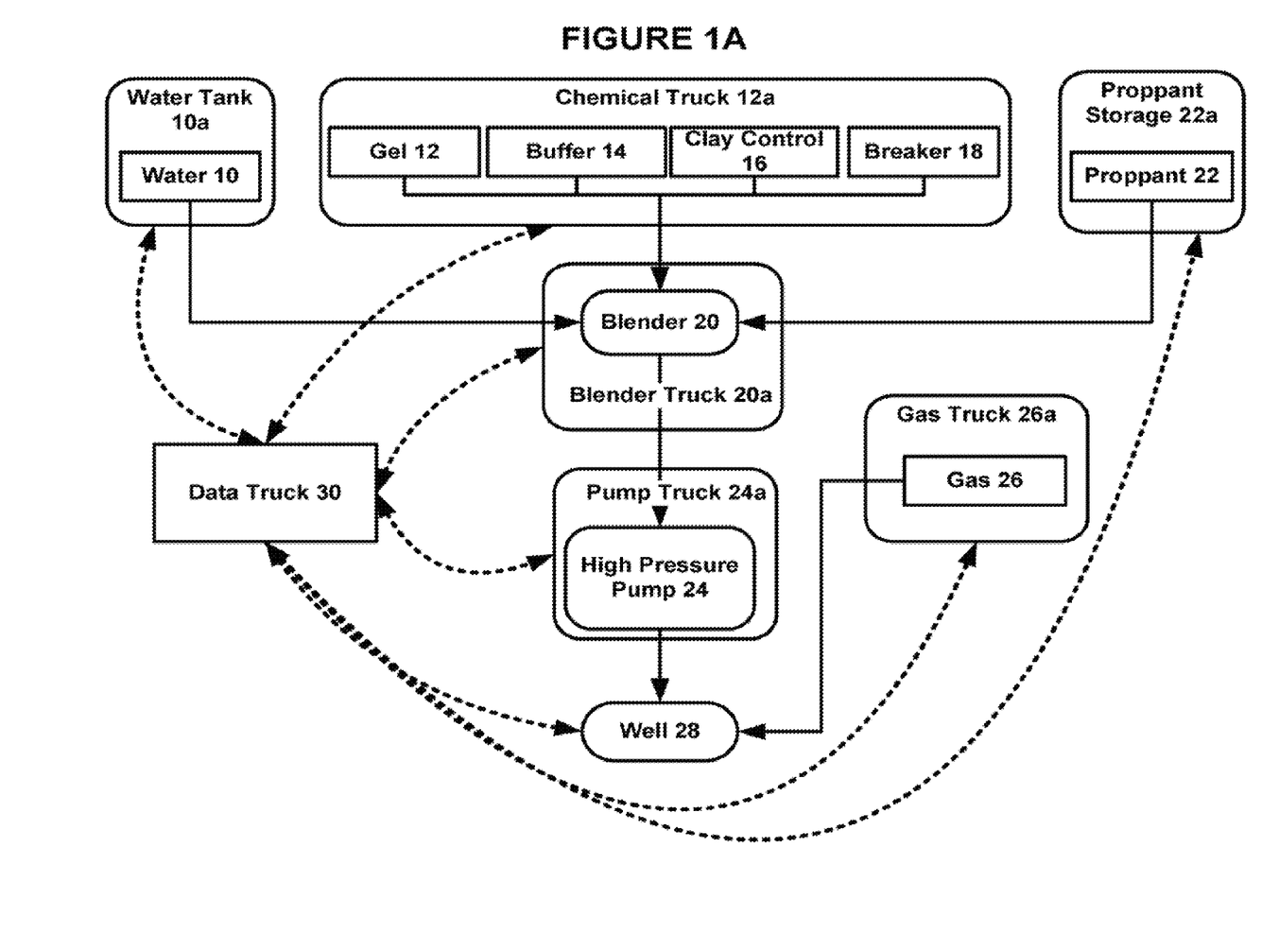
FIG. 1A is an overview of a typical equipment configuration for a fracturing operation in accordance with a first embodiment of the invention.

With reference to FIG. 1A, fracturing fluid compositions are generally prepared and utilized in accordance with the following methodology:
  a) A liquid component having desired properties is prepared at surface in a blender 20 with chemical additives from chemical truck 12*a*.
  b) Proppant 22 is added to the liquid component;
  c) The combined liquid/proppant mixture is introduced into a high pressure pump 24 and pressurized to well pressure;
  d) A gas component (typically, nitrogen or nitrogen/carbon dioxide mixtures) is introduced into a high pressure line leading to a well 28 where it mixes with the combined liquid/proppant mixture;
  e) The pressurized combined liquid/proppant/gas is pumped at a high rate down the well 28;
  f) The fracturing operation proceeds with the above fracturing fluid compositions being continuously prepared at the surface with varying ratios;
  g) Upon completion, surface mixing and pressurization are ceased and the surface equipment is detached and removed from the well;
  h) The well is flowed to remove as much fracturing gas and proppant as possible and turned over to production of methane from the CBM production zone.

As shown in FIG. 1A, and as will be explained in greater detail below, the preparation and blending of the liquid and gas components is achieved at a well site utilizing portable equipment.

Importantly, in comparison to past non-energized, energized, foamed or emulsied fluid technologies, the subject technology does not require the supply of as high volume of fluids for injection nor the disposal of as high volumes of fluids recovered from the well as the relative proportion of water in the overall fracturing fluid composition is substantially lower than that of a non-energized, energized, foamed or emulsied fluid. It should also be noted that in the preferred embodiments, that the liquid portion of the fracturing fluid requiring disposal is CBM friendly and environmentally friendly which also increases the options, reduces the costs and reduces the production zone damage. In comparison to past 100% pure gas technologies, the subject technology, by virtue of the liquid component supporting proppant prior to mixing, the need for specialized, pressurized batch mixing equipment is eliminated.

Fluid Compositions

Liquid Component

The liquid component generally comprises a linear gelled water and a breaker. The liquid component is designed to impart adequate but short-lived viscosity to the liquid component such that proppant can be temporarily supported within the liquid component at surface without settling and plugging surface pumping equipment. It is further designed such that the viscosity of the liquid component promptly relaxes during and after fracturing to promote mist or liquid slug formation and ensure flow back to the well.

Linear Gelled Water

The linear gelled water is formed from about 99 wt % water and 1 wt % gelling agent. Suitable linear gelling agents include guar gums (including guar gum derivatives and other gelling agents as known to those skilled in the art). A preferred guar derivative gelling agent is synthetic HEC (hydroxyethyl cellulose) or poly anionic cellulose (PAC). Guar gums are typically obtained as gum suspended in a mineral oil so as to promote easy operation mixing and continuous mixing with water.

Breaker

The breaker is typically hemicellulase enzyme added to the liquid component for relaxing viscosity in a controlled manner. Typically, a breaker is selected that reduces liquid component viscosity over a maximum 30 minute time period and preferably 10 minutes or less. For example, liquid component viscosity may initially be in the range of 18-30 cP at a shear rate of 170 sec$^{-1}$ and be effectively reduced to 1-10 cP over a 5-60 minute period. The amount of enzyme, temperature, and pH of the liquid component are controlled to provide the relaxation in viscosity. Other suitable breakers include oxidizers or encapsulated breakers as known to those skilled in the art, however they must also meet the non-toxic requirements and minimize damage to coal.

In one embodiment, breaker activity is controlled to relax viscosity within 10 minutes so as to more readily promote the formation of a mist or liquid slugs.

With reference to Table 1, various liquid component compositions are described that pass the non-toxic requirements that are CBM friendly. In accordance with the invention, it is understood that the primary function of the liquid component is to temporarily support proppant for a short time at surface prior to mixing with the gas component but not promote the formation of stable foams/emulsions on mixing. As such, various additives including surfactants, alcohols and clay control agents are not essential to the invention in that based on a specific application they may not be added to the fluid composition, however, in the event that they are desired and pass the non-toxic requirements as well as minimize CBM damage, they could also be added.

TABLE 1

Liquid Component Additives

| | Additive | Amount (% of total liquid component) | Examples and/or Composition (% of unmixed component) |
|---|---|---|---|
| Linear Gelled Water | Water | 98-99 wt % | Optionally, can contain KCl and/or other salts up to 10% KCl. Salts can provide clay control functions as well. |
| | Gelling Agent | 0.1-2 wt % | HEC (hydroxyethyl cellulose) (Century Oilfield Services Inc., Calgary, Alberta) |
| Breaker | Enzyme | 0.01-5 vol % | Hemicellulase Enzyme 0.1-5.0 wt % diluted in Ethylene Glycol 15-40 wt % and Water 60-85 wt % (Century Oilfield Services Inc., Calgary, Alberta) |

Non-Toxic and CBM Friendly Fracturing Fluid Compositions

In accordance with another aspect of the invention, green, environmentally friendly (EF) or non-toxic (NT) fracturing fluid compositions that are also CBM friendly are described. The fracturing fluid compositions are particularly effective for use in shallow wells. In particular, fracturing fluid compositions that pass standardized Microtox™ testing protocols are described.

Generally, the EF and CBM friendly compositions are water-based fracturing fluids in which the combination of constituents both individually and collectively pass Microtox™ testing and minimize damage to the CBM formation. For example, a fracturing fluid may be comprised of constituents A, B and C. Individually, A, B and C, in the concentrations used in the fracturing fluid may not be toxic, but collectively result in a "fail".

Accordingly, in a first instance, the subject technology describes those compositions in which the combined composition is non-toxic whilst providing desired fracturing fluid properties. Ideally, the constituents individually are also non-toxic.

In particular, EF fracturing fluid compositions include a water component, a viscosifier, a breaker and an optional clay stabilizer. Other optional compounds may be included in the formulation as long as they pass the required non-toxic testing and minimize damage to a CBM formation.

Foaming agents which are intentionally not added in these embodiments often have several negative impacts to CBM production zones. Absorption of foaming agents by the coal decreases the desorption process of the methane. Inherently, surfactants often can decrease the relative permeability potentially due to increasing water saturations. When flow in the CBM production zone is reversed after fracturing, residual foaming agents can re-foam and have an increased viscosity, causing a reduction or stop of methane flow.

Water Component

The water component generally includes water with or without appropriate buffering agents. Water is inherently non-toxic without and sometimes with many buffers as used in the industry at common concentrations. Suitable buffering agents include non-toxic acids and bases, however they need to also be CBM friendly which generally includes some organic acids, specifically formic acid. In the case that CBM is a saline water-containing production zone, using produced saline water from the dewatering process of neighboring wells in the same field for the fracturing base fluid is preferred to minimize damage on the coal faces. However, depending on the exact composition of the saline water, it may or may not pass Microtox™ tests. In the case that CBM is a fresh water-containing production zone, using the same fresh water from the dewatering process is preferred to minimize damage on the coal faces, as well as increase the ability of the water to pass Microtox™ tests and be considered non-toxic or green.

Viscosifier

EF viscosifiers are generally characterized by their relative purity and/or the absence of toxic additives when compared to past viscosifiers. Suitable viscosifiers include cellulose-based compounds such as guar and cellulose derivatives such as hydroxyethyl cellulose (HEC) and poly anionic cellulose (PAC). As compared to common past viscosifiers, EF viscosifiers are prepared and delivered in relatively pure form than those commonly used in the industry at present. For example, whereas past viscosifiers may be non-purified powders delivered as a suspension in a toxic hydrocarbon such as diesel or include surfactants as a suspension agent, EF viscosifiers are delivered either as a pure powder and/or suspended in a clean and generally non-toxic hydrocarbon such as a purified mineral oil.

CBM is typically damaged by residual solids adsorbing onto the coal surface which reduces the methane desorption process. Another effect of the residual solids is a decrease in relative permeability to gas by encouraging higher water saturations. CBM friendly viscosifiers leave no or little residual solids when broken that could be adsorbed onto the coal surface.

A preferred viscosifier for CBM fracturing is hydroxyethyl cellulose (HEC) or poly anionic cellulose (PAC). As HEC and PAC are similar to guar powders, they are very clean and hence, non-damaging to various formations, in particular coal formations, due to the minimal residue contained within the solution.

HEC, preferably having zero solids, is delivered suspended in a clean mineral oil (preferably an isoparaffinic hydrocarbon) where at the job site it is combined with the water component to form a viscosified fracturing fluid. HEC is a derivatized guar composed of mannose and glucose sugar molecules. The difference between conventional guar and HEC is the arrangement of the hydroxy pairs on the polymer backbone. Guar has hydroxy pairs located on the same side (cis orientation) of the backbone making it very easy to crosslink. In contrast, HEC has hydroxy pairs located on opposite sides (trans orientation) of the backbone which substantially affects crosslinking of the gel, if it is applied as such, unless the pH of the solution is above 10.

The determination of the relative toxicity of a viscosifer is achieved by Microtox™ testing at a comparable loading in water. Thus, the desired loading for a fracturing fluid is determined and the viscosifier diluted to that loading in water and subjected to standardized Microtox™ testing.

The use of mineral oil as a suspending agent provides several advantages over past systems. These advantages include a) powders suspended in mineral oil do not form "fish eyes", known to those skilled in the art, b) the suspension is stable, and c) no preservatives are required. In some preferred embodiments, for maximum CBM compatibility a specialized extra piece of equipment, called a dry gelling agent hydration unit, can be used to introduce the gel to avoid the use of any mineral oil. Mineral oil is known to potentially interact chemically with and adsorb onto the surface of the coal.

Breaker

Breakers traditionally have a fine balance of chemistry and composition to reliably break the fracturing composition over time without flash breaking (immediate reduction of viscosity below 10 cP). CBM formations have a tendency to adsorb many chemicals, including breakers, particularly at lower temperatures, making the selection of breaker chemistry and concentration challenging. As well, the effect of the breaker decreases as it is adsorbed onto the coal formation as it reduces the amount of breaker left in solution to break the gelled water in a controlled manner.

Due to various geochemical properties in the same geological horizon and region, the CBM absorption effect changes well to well, adding an extra challenge to determining the right breaker loading. In addition, because laboratory tests on fracturing fluid compositions are most commonly done without exposure to CBM samples, an additional fluid compositional challenge is encountered. As applied in this invention, the fracturing composition is weighted heavily towards large amounts of breaker which solves the normal issues with determining the fine balance for breaker loadings by weighing on relatively extreme amounts of breaker, as there is no lower limit for viscosity in this invention. In general, enzyme breakers are less damaging than chemically reactive oxidizer breakers. In the preferred embodiment, hemicellulase enzyme is used as the breaker.

Clay Stabilizer

Clay stabilizers have the function of preventing formation damage caused by the swelling and plugging of pore throats due to swelling or mobile clay particles. Many CBM formations do not contain significant amounts of clay and thus are not in need for clay stabilization chemicals to achieve methane desorption. In general with respect to CBM formations, the cleated coal physically filters, chemically reacts with or otherwise adsorbs most injected agents to potentially significant extents. The resulting damage to the CBM formation can partly or drastically reduce the ability of the methane to desorb and flow to the well at economic rates. In preferred embodiments, clay control agents are not used. However in other embodiments, salts or other chemicals that are CBM friendly and non-toxic can be utilized as clay control agents.

Table 2 shows EF fracturing fluid constituents suitable for preparing CBM friendly fracturing fluid compositions in accordance with the invention. Typical and preferred loading concentrations (kg/m$^3$ or L/m$^3$) are shown.

The actual concentration of constituent compounds will vary based on the desired fracturing fluid properties provided that the resulting fracturing fluid will pass the Microtox™ test and will have minimal damage to the coal production zone.

Microtox™ Test Results

Table 3 shows representative Microtox™ test results for constituent viscosifer, clay stabilizer and breakers at various loadings.

TABLE 3

Representative Microtox™ Test Results for Constituent Viscosifer, Clay Stabilizer and Breakers

| Composition Tested | EC50 Result (%) | Pass/Fail |
|---|---|---|
| HEC gel (0.36 wt %) in fresh water | >91 | Pass |
| 4 wt % KCl water | >91 | Pass |
| hemicellulase enzyme (0.02 wt %) | >91 | Pass |
| 0.36 wt % HEC, 4 wt % KCl, 0.02 wt % hemicellulase enzyme | 76 | Pass |
| 0.002 wt % formic acid | >91 | Pass |
| 0.00025 wt % octamethylcyclotetrasiloxane | 82 | Pass |
| 0.25 wt % in fresh water | >91 | Pass |

>75% EC50 result is required for pass

Field Methodology and Equipment

As noted previously, FIG. 1A shows an overview of the equipment and method of fracturing a well in accordance with the invention. Base fluids including water 10 (from water tank 10a), gelling agent 12, buffer 14, clay control 16, and breaker 18 (from chemical truck 12a) are selectively introduced into a blender 20 (on blender truck 20a) at desired concentrations in accordance with the desired properties of the fluid composition.

Figure 1B:
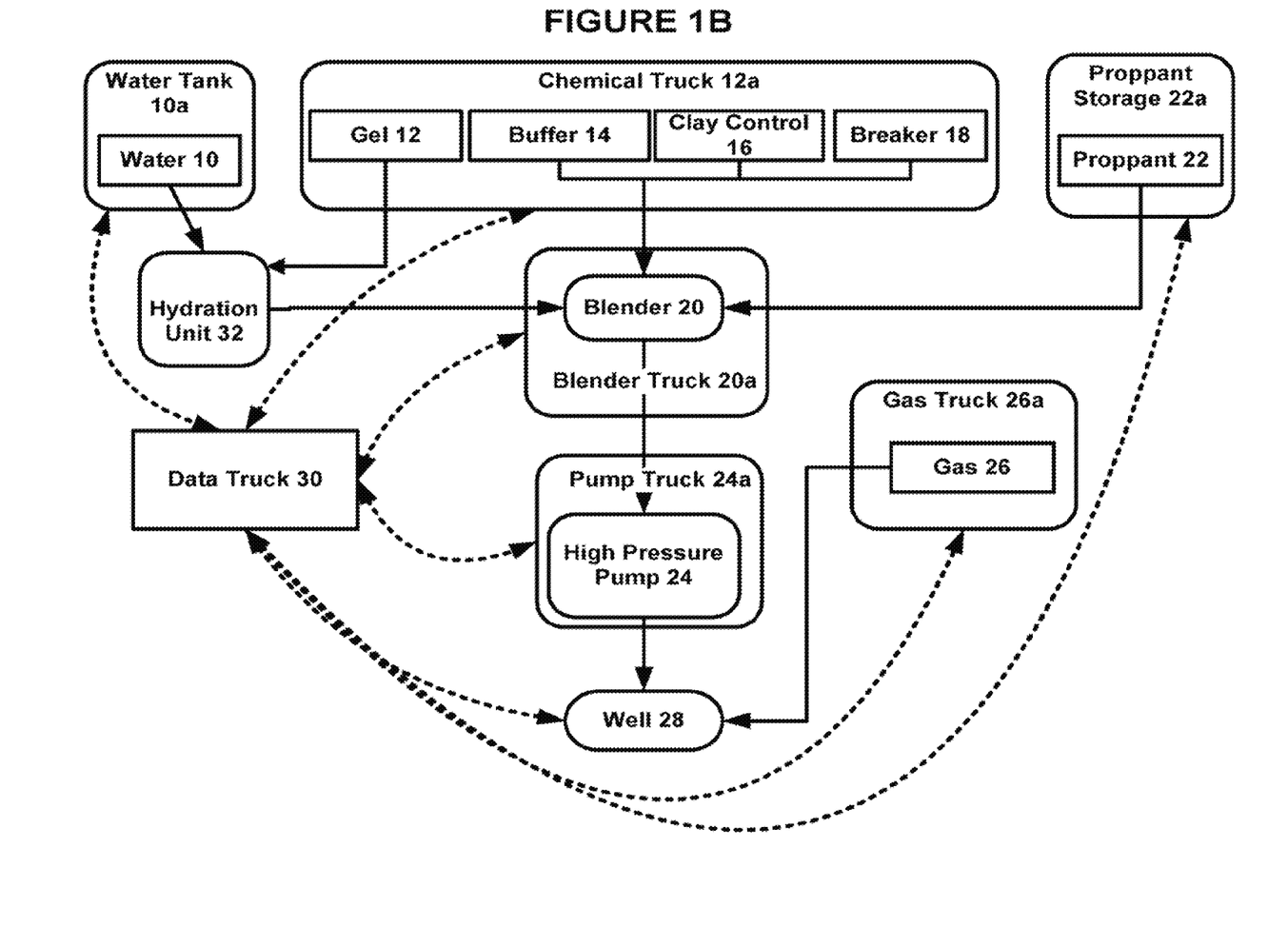
FIG. 1B is an overview of a typical equipment configuration for a fracturing operation in accordance with a second embodiment of the invention.

FIG. 1B shows a further embodiment of the invention wherein a powder gelling agent is used. The gelling agent 12 is introduced into a hydration unit 32 to mix with the water 10 to form a viscosified water that is delivered to blender truck 20a. Upon establishment of the desired viscosity of the fluid composition, proppant 22 (from proppant storage 22a) is added to the composition and blended prior to introduction into a high pressure pump 24 (on pump truck 24a). Gas 26

TABLE 2

EF Fracturing Fluid Constituents Suitable For Preparing CBM Friendly Fracturing Fluid Compositions

| Component | Examples | Concentration |
|---|---|---|
| Water component | Water | |
| Gelling Agent (Viscosifier) | Cellulose derivatives as powders or powders suspended in pure mineral oils<br>Hydroxyethyl cellulose (HEC) (Century Oilfield Services, Calgary, Alberta)<br>Poly anionic cellulose (PAC) (Century Oilfield Services, Calgary, Alberta) | Dry form: 1-20 kg/m$^3$ preferably about 3 kg/m$^3$<br>Suspended form: 2-40 L/m$^3$ preferably about 8 L/m$^3$ |
| Clay Control Agent | KCl or naturally occurring salts in the CBM zone in situ saline water<br>diallyl dimethyl ammonium chloride (DADMAC) (Century Oilfield Services, Calgary, Alberta) | Optional, >0-12% preferably about 4% (by weight)<br>>0-0.75% preferably about 0.14% (by weight) |
| Breaker | Hemicellulase enzyme in a non-toxic carrier fluid such as water. (Century Oilfield Services, Calgary, Alberta) | >0 to 0.05% preferably about 0.005% (by weight) |

(from gas truck 26*a*) is introduced into a high pressure line between the high pressure pump 24 and a well 28 prior to introduction into the well 28. A data truck 30 is configured to the equipment to collect and display real time data for controlling the equipment and to generate reports relating to the fracturing operation.

The blender blends the base fluids and proppant and chemical and includes appropriate inlets and valves for the introduction of the base fluids from the water tanks, hydration unit, chemical truck and proppant storage. The blender preferably includes a high shear tub capable of blending in the range of 1000-5000 kg (preferably about 2200 kg) of proppant per $m^3$ of fluid.

The base liquid components including gel and breaker (and optionally buffer or clay control agents) are delivered to a field site in a chemical truck 12*a*. The chemical truck includes all appropriate chemical totes, pumps, piping and computer control systems to deliver appropriate volumes of each base liquid component to the blender 20.

Water tanks 10*a* include valves to deliver water to the blender via the blender hoses and optionally a hydration unit to be used if the gel is to be delivered without the use of mineral oil.

The high pressure pump(s) typically each have a nominal power rating in the range of 1500 kW and be capable of pumping up to 2 $m^3$/minute of liquid fracturing fluid and proppant through 4.5-5" pump heads in order to produce downhole operating well pressures up to 15,000 psi. Depending on the size of the fracturing operation, 1-6 liquid high pressure pumps may be required.

Most commonly nitrogen is the gas used in field applications to dilute the slurry of fluid and proppant from the high pressure pump. For clarity in describing the fracturing fluid composition, in the industry and in the context of this description, it is known that nitrogen is bought and sold and measured in terms of its volume with reference to standard conditions (1 atm and 15° C. or thereabouts) and referred to in units of "scm" (standard cubic meters or cubic meters under standard conditions as noted above). The physical state of nitrogen received at a well site is in a refrigerated liquid form stored at about 1 atm gauge pressure (2 atm absolute pressure) and about −145° C. to −190° C. The ratio of 1 $m^3$ of liquid nitrogen as delivered is equivalent to about 682 scm at standard atmospheric conditions. Nitrogen is pumped in its cryogenic liquid state taking it from storage pressure to well pressure, then gasified by heating it to 20° C., whereupon it enters the high pressure line where it mixes with the fracturing liquid composition and proppant.

This turbulent mixture is then pumped down the well where it warms up to as much as the formation temperature and reaches the pressures used to fracture the CBM production zone. The estimated temperature and pressure under pumping conditions of the CBM production zone is used to estimate the compression of nitrogen in the form of the number of standard cubic meters per cubic meter of actual space at the CBM production zone.

For example, 1 $m^3$/min of cryogenic liquid from the nitrogen truck may be pressurized to 20 MPa surface pressure, heated to 20° C., mixed with the fluid and proppant at the desired volume % ratios and pumped in the well to the formation. If the pumping pressure and temperature of fracturing into the CBM production zone is 18 MPa and 30° C., the compression at these conditions is about 160 scm occupying 1 $m^3$ of actual space. The 682 scm/min of nitrogen rate as it would be referred to in the field operations relates to an actual flow rate at the CBM production zone during fracturing of 4.26 $m^3$/min (682 scm/min divided by the compression ratio of 160 scm/$m^3$). When the frac is flowed back, as pressure and temperature changes the nitrogen gas expands as it flows with fluid to flow back tanks at surface for separation and disposal.

Generally, the fracturing composition is formulated for a desired composition input to the formation at formation conditions. As such, the ratio between the fluid component and gas component as measured in volume % at the surface will likely be different to what is delivered to the formation. As known to those skilled in the art, the difference between surface pressure and bottom hole pressure may have either a positive or negative variance depending on parameters including the hydrostatic pressure and friction pressures between the surface and the formation. For example, for a typical fracturing composition in accordance with the invention, where a 10/90 volume % liquid/gas composition is to be injected at the formation, may depending on the depth of the formation and the friction pressures of the specific composition conveyance equipment require either higher or lower ratio of liquid to gas mixing at surface at a given surface pressure.

In the preferred embodiment, a combination of carbon dioxide and nitrogen are used to dilute the fluid and proppant and to prevent damage to the coal. In another embodiment, just carbon dioxide is used. The storage vessel for carbon dioxide is under storage conditions of about 150 psi and about −30° C. Carbon dioxide vessels may also be pressured to 300 psi with nitrogen gas to boost the pressure of the vessel during the fracturing operation. Carbon dioxide liquid is suctioned from the bulk vessel and/or pushed with nitrogen gas to a high pressure pump identical to the fluid pump to increase the carbon dioxide to well pressure. The carbon dioxide mixes with the fluid and proppant, as well as with nitrogen gas in the preferred embodiment, and the mixture is pumped into the well and ultimately into the CBM production zone. The carbon dioxide warms up and turns to a gas while flowing back with any well fluids into flow back tanks at the surface for separation and disposal. Carbon dioxide also preferentially replaces methane on the coal surface initially accelerating the methane desorption process, where nitrogen gas is mostly inert with little adsorption effect.

Lab Examples

Test samples of the fluid composition were prepared in accordance with the following general methodology. A volume of a base fluid (for example water) was measured in a beaker from a bulk source and added to a variable speed Waring blender. The fracturing liquid component additives were measured in disposable plastic syringes from bulk sources. The Waring blender was turned on to an appropriate speed and the additives were added to the base fluid sequentially. The samples were blended for about 0.5 minutes (or slightly longer as required). To foam a sample, the Waring blender was turned to a higher speed setting for at least 10 seconds. The fracturing fluid test sample was then ready to be used in the various experiments.

Test samples of the proppant (sand) were prepared in accordance with the following general methodology. A volume of 20/40 Ottawa white sand, commonly available, was taken from a bulk source in a beaker.

Test samples of the fluid were measured for proppant (sand) support under static conditions using the following general methodology. A fracturing fluid composition was prepared and a sand sample was obtained according the previous methodologies described. 90% of the volume of a fluid sample was blended without sand in one Waring blender. The remaining 10% of the volume of a fluid sample was blended with sand in a second Waring blender. The fluid sample without proppant was quickly placed in a graduated cylinder with the sand laden fluid sample placed on top. The sand volume accumulation was observed at the bottom of the graduated cylinder and compared to the initial proppant sample used. A longer accumulation time (i.e. a lower fall rate for the particles) indicated a greater tendency of the fracturing fluid to support proppant.

Test samples of the fluid were measured for viscosity with the following general methodology. A Brookfield PVS rheometer (Brookfield Engineering Laboratories, Middleboro, Mass.) was utilized to measure the viscosity of the liquid fracturing fluid compositions. The oil bath temperature was set to a specific temperature according to each experiment. 250 mL of liquid fracturing fluid composition was blended in a Waring blender. A 50 mL plastic syringe was used to transfer a 35 mL sample from the prepared liquid fracturing fluid composition in the Waring blender to the rheometer cup. The cup was screwed on to the rheometer such that the bob was appropriately immersed in the fluid, the sealed cup was exposed to 400 psi nitrogen pressure above the fluid, and the cup immersed in the oil bath for temperature control according to the general procedures as known to those skilled in the art.

Experiments

Viscosity vs. Time

Figure 2:
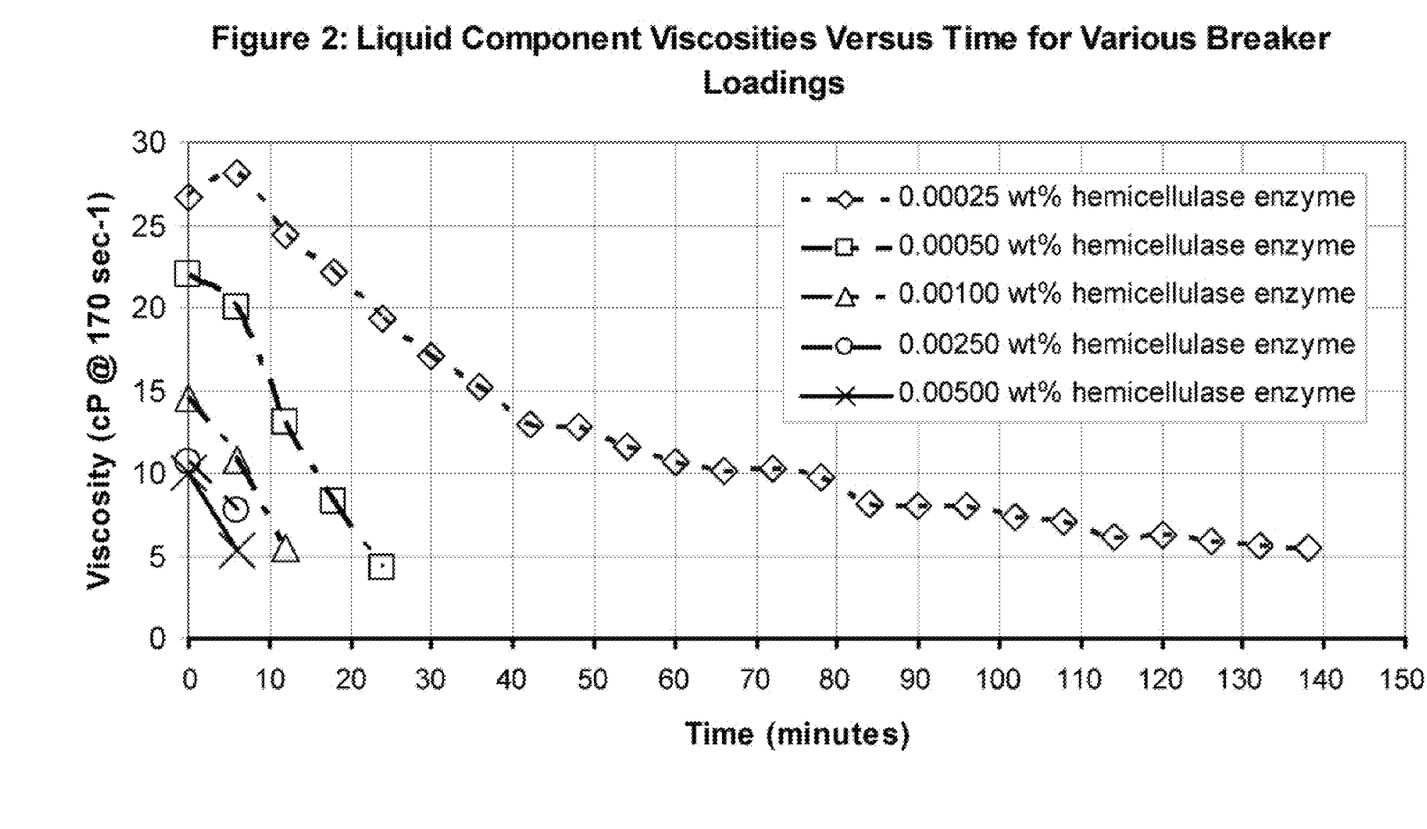
FIG. 2 is a graph showing liquid component viscosity vs. time for different concentrations of breaker.

FIG. 2 shows the effect of varying breaker concentration on viscosity of a liquid fracturing fluid composition as a function of time. The fluid composition was a blend of water with additive concentrations of 0.36 wt % hydroxyethyl cellulose, 0.46 wt % Mineral Oil, and various loadings of hemicellulase enzyme. The viscosity was measured at 30° C. and a shear rate of 170 sec$^{-1}$. As shown, as the breaker concentration was varied from 0.00025-0.0050 wt %, the viscosity of the fluid composition relaxed in approximately one twentieth of the time to 10 cP at a shear rate of 170 sec$^{-1}$ (2 to 7 minutes compared to 78 minutes).

Most fracturing stimulation operations finish in more time than 2 to 7 minutes. The standard, as known to those skilled in the art, is to have higher viscosity values until the time planned for the fracturing stimulation is reached, or by default, about 90 minutes. This invention demonstrates that the temporary viscosity of the fracturing fluid is brought below 10 cP (considered a "broken" or relaxed fluid) before the fracturing stimulation operation is finished, and in some of the experiments the viscosity was at or below 10 cP almost immediately.

Foam Stability

Figure 3:
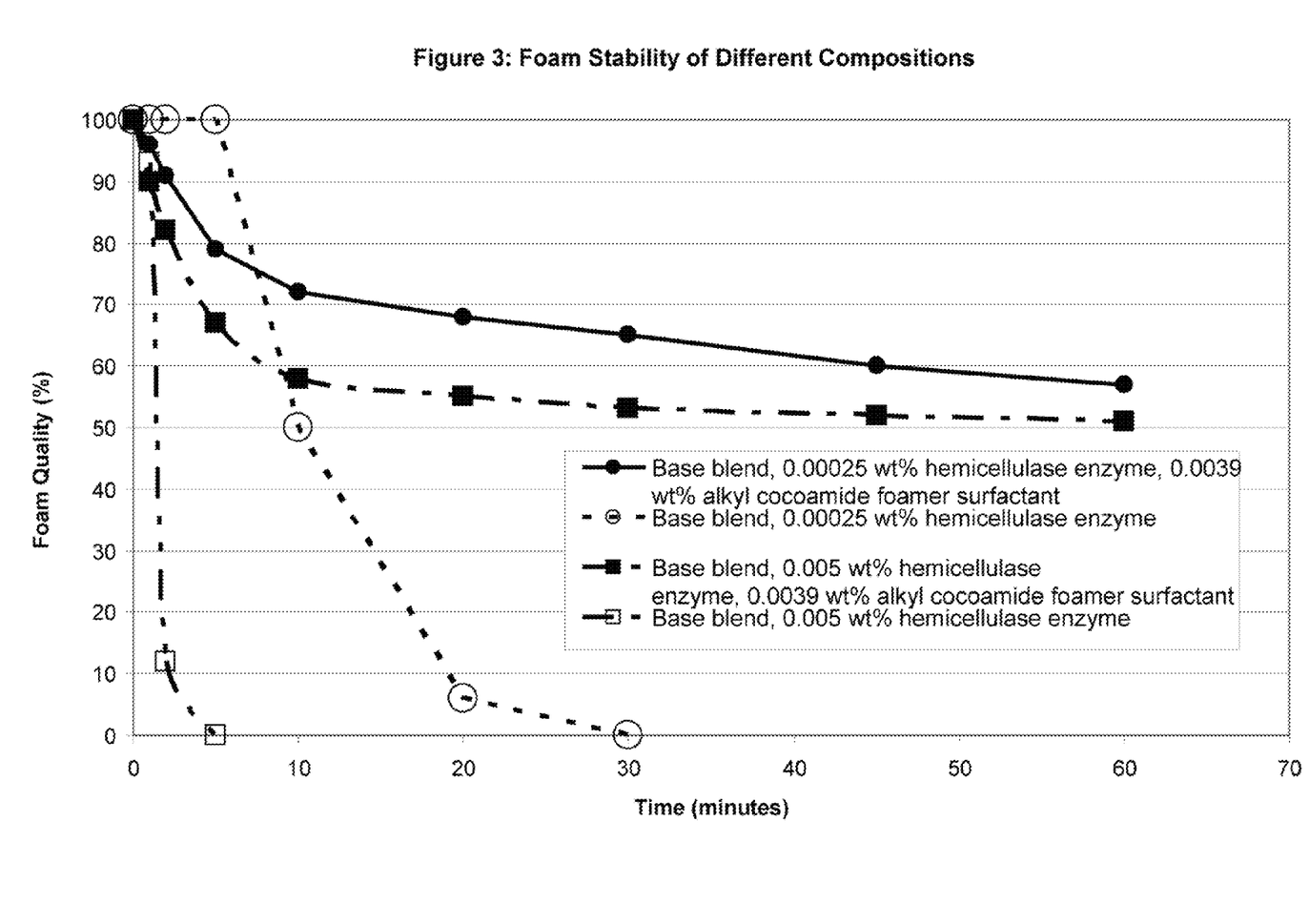
FIG. 3 is a graph showing foam stability vs. time for liquid component compositions having foaming agent or the absence of foaming agent.

FIG. 3 shows the effect of introducing additives that are known foaming agents as compared to avoiding the use of foaming surfactants by measuring foam stability as a function of time. A blend of water base fluid with additive concentrations of 0.36 wt % hydroxyethyl cellulose, 0.46 wt % Mineral Oil, and various loadings of foaming surfactant agents and hemicellulase enzyme are shown in FIG. 3. In these experiments, the liquid fracturing fluid composition was agitated in a Waring blender at the 100% (maximum) speed setting to produce foam. After cessation of agitation, the height of the foam was measured immediately and at time intervals thereafter. Foam half life, a common observation, is defined as the time in which half of the foam height is reduced. As shown, a standard foaming agent at a common concentration (0.0039 wt % alkyl cocoamide) used to produce foams had a typical foam stability, compared to essentially no foam stability with the plain base blend with either breaker loading. Additionally, the base blend had an observed foam half life of 1.5 to 10 minutes where the base blend plus the foaming agent had a foam half life greater than 60 minutes.

Proppant Support

Figure 4:
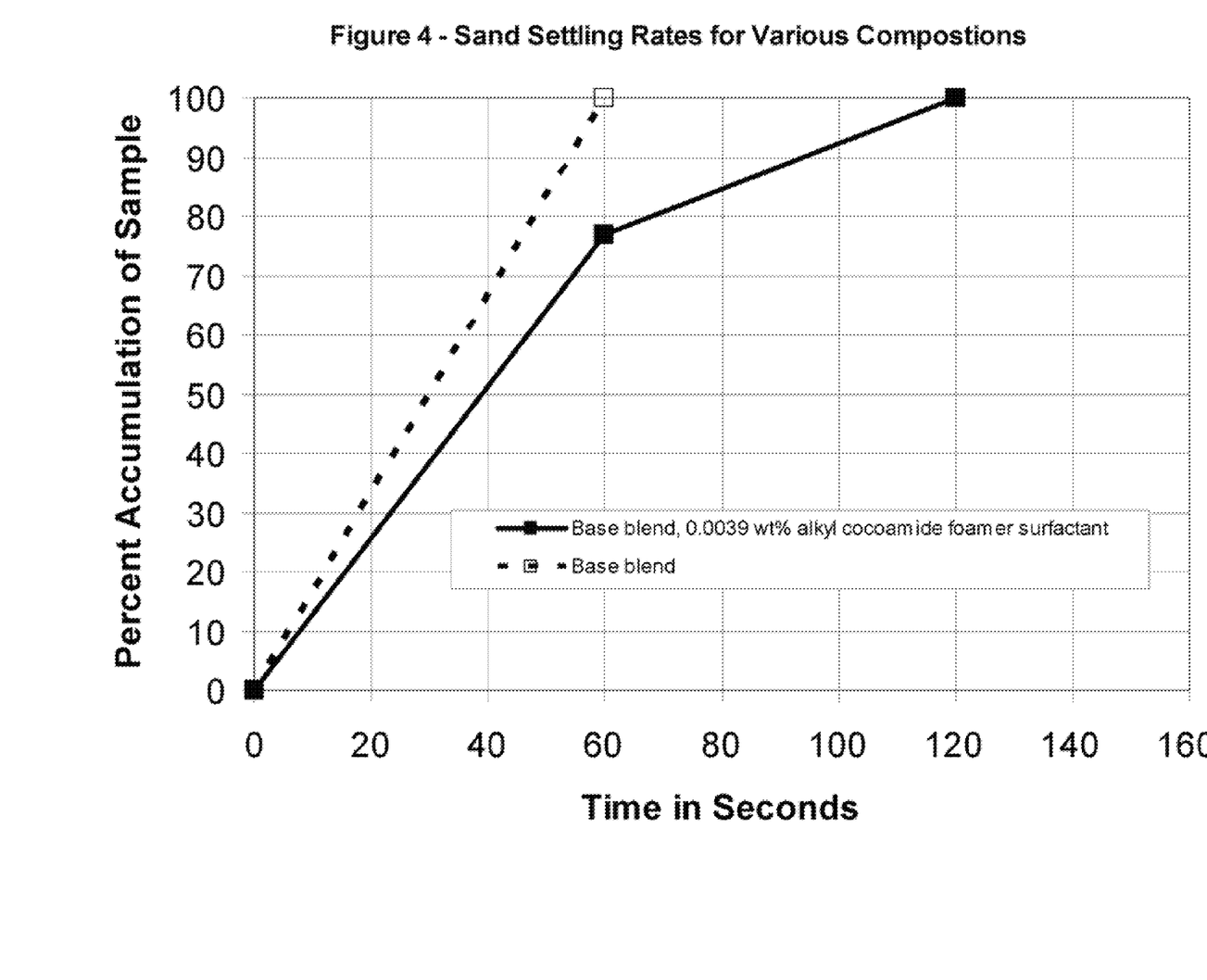
FIG. 4 is a graph showing sand setting times for liquid component compositions having foaming agent or the absence of foaming agent.

FIG. 4 shows the effect of proppant support in various fracturing fluid compositions that have varying foam stability. 350 mL of a common fracturing fluid composition (foamed) was created using a water base fluid with additive concentrations of 0.36 wt % hydroxyethyl cellulose, 0.46 wt % Mineral Oil, 0.00025 wt % hemicellulase enzyme and various loadings of foaming surfactant agents as noted in FIG. 4. When 0.0039 wt % of a foaming surfactant agent is used in the fracturing fluid composition, a stable foam was created, and the time for 100% accumulation of the 20/40 mesh sand sample at the bottom of the graduated cylinder was 2 minutes. When a foaming surfactant agent was not used and a stable foam was not created, the time for 100% accumulation of the 20/40 mesh sand sample at the bottom of the graduated cylinder was less than 1 minute. The sample without the foaming agent had two times the sand settling rate compared to the stable foam sample.

FIELD EXAMPLES

The following are representative examples of field trials of the subject technology.

Field Example 1

26-20W4

The well was characterized by having perforations in the Edmonton, Belly River, Milk River and Medicine Hat formation CBM production zones as shown in Table 4 in the "Perforation Interval" column. The casing was isolated below 990 m. The stimulation was pumped down 73 mm (8.04 kg/m QT-700) coiled tubing utilizing zonal isolation cups in 114.4 mm, 14.14 kg/m, J-55 casing to attempt to place 7,000 kg of 20/40 sand into the CBM production zones in a manner as stated in the "Sand Pumped" column of Table 4. The base of groundwater protection for this well is 306.6 m for which 5 sets of perforations are shallower than this depth and require to be non-toxic by government regulation.

TABLE 4

| | Field Example 1 | | | | | | | | |
|---|---|---|---|---|---|---|---|---|---|
| Perforation Interval | N2 Pad (scm) | Total Fluid (m$^3$) | Rev. N2 (scm) | N2 Total (scm) | Sand Pumped (1000 s kg) | Ave Pressure (MPa) | Break Pressure (MPa) | Instant. SIP (MPa) | 1 min. SIP (MPa) |
| 930 m to 932 m | 2000 | 2.7 | 4060 | 4029 | 1.90 | 25.0 | 23.3 | 17.4 | 13.2 |
| 866 m to 867 m, 861 m to 862 m | 2000 | 3.3 | 1000 | 4550 | 2.90 | 33.6 | 27.5 | 19.8 | 13.1 |

TABLE 4-continued

Field Example 1

| Perforation Interval | N2 Pad (scm) | Total Fluid (m³) | Rev. N2 (scm) | N2 Total (scm) | Sand Pumped (1000 s kg) | Ave Pressure (MPa) | Break Pressure (MPa) | Instant. SIP (MPa) | 1 min. SIP (MPa) |
|---|---|---|---|---|---|---|---|---|---|
| 712 m to 713 m | 1000 | n/a | 1050 | 3650 | 0.00 | 45.0 | 37.5 | 28.9 | 16.8 |
| 701 m to 702.5 m | 900 | n/a | 1000 | 3500 | 0.00 | 46.9 | 33.9 | 28.5 | 17.5 |
| 608 m to 610 m | 2000 | 2.6 | 1000 | 4000 | 1.90 | 34.7 | 20.0 | 16.6 | 13.8 |
| 550 m to 551.5 m | 1100 | n/a | 1200 | 3550 | 0.00 | 44.1 | 32.3 | 22.7 | 14.3 |
| 344.5 m to 345.5 m | 900 | n/a | 0 | 3500 | 0.00 | 43.0 | 26.5 | 18.5 | 10.2 |
| 218.5 m to 219.5 m, 215 m to 216 m | 1000 | n/a | 0 | 6025 | 0.00 | 40.0 | 27.3 | 20.9 | 9.4 |
| 207 m to 209 m | 900 | n/a | 0 | 6000 | 0.00 | 42.3 | 24.5 | 22.7 | 9.5 |
| 202 m to 204.5 m | 1000 | n/a | 0 | 7300 | 0.00 | 39.7 | 25.6 | 19.8 | 8.4 |
| 196 m to 197 m | 900 | n/a | 0 | 3500 | 0.00 | 42.5 | 25.6 | 21.1 | 11.1 |

Prior to the fracture, the well was not on production status.

At the job site, all truck-mounted equipment was positioned and connected in accordance with standard operating practice. All fluid tanks were filled with fresh water. Water was heated to 20-25° C. prior to the fracturing operation. The coiled tubing was pressure tested to 55 MPa with a maximum working pressure of 48 MPa.

At the perforation zone, an initial 100% nitrogen pad (volume in the "N2 Pad" column of Table 4) was injected into the producing zone to create at least one fracture. Depending on the CBM production zones in the region, each perforated interval is stimulated a particular way for optimum production (either with nitrogen/fluid/proppant or nitrogen only) as indicated in Table 4. After the initial 100% nitrogen pad, if required, a fluid composition having a base fluid of fresh water with the additives of 0.36 wt % hydroxyethyl cellulose, 0.1 wt % Ethylene Glycol, 0.46 wt % Mineral Oil, 0.1 wt % diallyl dimethyl ammonium chloride, and 0.0025 wt % Hemicellulase Enzyme was prepared in the blender.

Proppant (20/40 mesh sand) was admixed to the fluid composition, when used, at a ratio of 2000 kg of sand per m³ of fluid.

When proppant was required, the rate of fluid/sand slurry mixture started at 0.59 m³/min and increased to 0.88 or 1.05 m³/min (depending on the CBM production zone) during the proppant pumping. The overall perforation equivalent rate of gas, fluid and proppant in the formation was estimated to vary between 3.71 m³/min and 4.68 m³/min during the proppant stages.

Nitrogen gas was introduced to the high pressure line between the high pressure pump and well head. The nitrogen gas rate was varied to result in 4 different rates for each CBM production zone ranging from 600 scm/min down to 306 scm/min which diluted the fluid and sand composition pumped down the well head to the formation. The gas quality (gas volume at the perforations divided by the gas and fluid volume at the perforations) was 100% in the pad and ranged between 92.1% and 85% in the proppant/fluid stages to result in an overall inject gas quality placed in the CBM production zones ranged from 95.1% to 96.3%. This did not include the flush of the well of proppant, and only the material that passed the perforations to get into the CBM production zone. The overall concentration of sand placed into the CBM production zones range from 300 kg of sand/m³ of combined fluid and gas to 350 kg/m³ of combined fluid and gas. In total, 6,700 kg of proppant was delivered to the formation intervals as shown in Table 4 in the "Sand Pumped" column.

Several pressures were observed during the stimulation of each CBM production zone in Table 4. Overall, the first pressure observation was the breakdown pressure which represents the pressure at surface during the fracture creation or initiation. The second pressure observation was the average surface pressure during fracturing. The instantaneous shut in pressure at surface (Instant SIP) was recorded at the end of pumping, as well as a one minute after pumping shut in pressure (1 min SIP).

Upon completion, the well was vacated and an estimated 5.2 m³ of fluid was recovered from the well for disposal. In comparison to an energized fluid frac, this represented a 4 fold decrease in the amount of water requiring disposal.

Focusing on the shallowest most CBM production zone which has non-toxic requirements (196 m to 197 m), the risk for cross flow was evaluated where a higher pressured zone deeper in the well could flow into said CBM production zone. Two methods were used, the one minute shut in pressure in the stimulated well and average regional reservoir pressures, both corrected for estimated hydrostatic well gradients and depth. Using the one minute shut in pressure, all CBM production zones from 550 m to 930 m (which includes all three fluid stimulations) have a higher risk of initially flowing into the shallow most zone during well clean up immediately after the fracturing operations when the coiled tubing is removed from the well, and all CBM production zones in the well are commingled together. The stimulated well had a measured reservoir pressure at 196 m to 553 m ranging from 0.66 MPa to 0.68 MPa a month after the stimulation. Looking at the reservoir pressure for the deeper zones in the region (within 5 kilometers of the stimulated well), the reservoir pressure is 2.9 to 4.1 MPa at depths of 855 m to 901 m. This causes long term risk of cross flow of the deeper zones injected with fluids flowing some of the fluid into the shallowest zone with the non-toxic requirements. In general when all CBM production zones are commingled at a variety of depths and time dependent reservoir pressures, there is risk that any CBM production zone could flow into any other CBM production zone.

Gas flow rates from the well after fracturing started at 0.88 E3M3/day and increased to 1.14 E3M3/day on the fourth month of production (the average of production was 0.67 E3M3/day flowing over the first four months of production).

Field Example 1

26-20W4

The well was characterized by having perforations in the Medicine Hat and Horseshoe Canyon CBM production zones as shown in Table 5 in the "Perforation Interval" column. The casing was isolated below 990 m. The stimulation was pumped down 83 mm (9.20 kg/m QT-800) coiled tubing utilizing zonal isolation cups in 114.4 mm, 14.14 kg/m, J-55 casing to attempt to place 2,000 kg of 20/40 sand into the Medicine Hat production zones in a manner as stated in the "Sand Pumped" column of Table 5. The base of groundwater protection for this well is 367 m for which 5 sets of CBM perforations are shallower than this depth and require to be non-toxic by government regulation.

TABLE 5

Field Example 2

| Perforation Interval | N2 Pad (scm) | Total Fluid (m³) | Rev. N2 (scm) | N2 Total (scm) | Sand Pumped (1000 s kg) | Ave Pressure (MPa) | Break Pressure (MPa) | Instant. SIP (MPa) | 1 min. SIP (MPa) |
|---|---|---|---|---|---|---|---|---|---|
| 874 m-875 m | 4300 | 2.5 | 500 | 4029 | 2.00 | 22.3 | 25.1 | 19.9 | 24.5 |
| 650 m-651 m, 644 m-646 m | 8700 | | 1200 | 4550 | | 31.7 | 29.2 | 30.0 | 33.7 |
| 459 m-460 m | 3650 | | | 3650 | | 39.0 | 35.9 | 35.4 | 42.1 |
| 323 m-325 m | 6200 | | | 3500 | | 32.9 | | 32.5 | 33.4 |
| 311 m-312 m | 3700 | | | 4000 | | 38.0 | 28.6 | 36.7 | 40.2 |
| 264.5 m-265.5 m | 3600 | | | 3550 | | 33.4 | 26.3 | 32.6 | 35.7 |
| 243 m-244 m | 3500 | | | 3500 | | 34.0 | 25.4 | 31.5 | 37.6 |
| 236 m-237 m | 3600 | | | 6025 | | 28.9 | 21.7 | 27.8 | 31.5 |

Prior to the fracture, the well was not on production status.

At the job site, all truck-mounted equipment was positioned and connected in accordance with standard operating practice. All fluid tanks were filled with fresh water. Water was heated to 20-25° C. prior to the fracturing operation. The coiled tubing was pressure tested to 55 MPa with a maximum working pressure of 48 MPa.

At the perforation zone, an initial 100% nitrogen pad (volume in the "N2 Pad" column of Table 5) was injected into the producing zone to create at least one fracture. Depending on the CBM production zones in the region, each perforated interval is stimulated a particular way for optimum production (either with nitrogen/fluid/proppant or nitrogen only) as indicated in Table 5. After the initial 100% nitrogen pad, if required, a fluid composition having a base fluid of fresh water with the additives of 0.36 wt % hydroxyethyl cellulose and 0.005 wt % Hemicellulase Enzyme was prepared in the blender.

Proppant (20/40 mesh sand) was admixed to the fluid composition, when used, at a ratio of 2000 kg of sand per m³ of fluid.

When proppant was required, the rate of fluid/sand slurry mixture started at 0.61 m³/min and increased to 0.88 m³/min during the proppant pumping. The overall perforation equivalent rate of gas, fluid and proppant in the formation was estimated to vary between 3.23 m³/min and 4.30 m³/min during the proppant stages.

Nitrogen gas was introduced to the high pressure line between the high pressure pump and well head. The nitrogen gas rate was varied to result in 3 different rates for each CBM production zone ranging from 575 scm/min down to 315 scm/min which diluted the fluid and sand composition pumped down the well head to the formation. The gas quality (gas volume at the perforations divided by the gas and fluid volume at the perforations) was 100% in the pad and ranged between 92.5% and 82.5% in the proppant/fluid stages to result in an overall inject gas quality placed in the CBM production zones ranged from 86.3%. This did not include the flush of the well of proppant, and only the material that passed the perforations to get into the CBM production zone. The overall concentration of sand placed into the production zone ranged from 150 kg of sand/m³ of combined fluid and gas to 350 kg/m³ of combined fluid and gas. In total, 2,000 kg of proppant was delivered to the formation intervals as shown in Table 5 in the "Sand Pumped" column.

Several pressures were observed during the stimulation of each CBM production zone in Table 5. Overall, the first pressure observation was the breakdown pressure which represents the pressure at surface during the fracture creation or initiation. The second pressure observation was the average surface pressure during fracturing. The minimum and maximum pressures are also recorded for each zone in Table 5.

Upon completion, the well was vacated and an estimated 1.5 m³ of fluid was recovered from the well for disposal. In comparison to an energized fluid frac, this represented a 4 fold decrease in the amount of water requiring disposal.

There was a large longer term risk for cross flow where the much higher pressured deepest conventional zone in the well would flow into the severely underpressured CBM production zones of which 5 have non-toxic requirements. In general when all CBM production zones are commingled at a variety of depths and time dependent reservoir pressures, there is risk that any CBM production zone could flow into any other CBM production zone.

Gas flow rates from the well after fracturing started at 1.27 E3M3/day and increased to 1.33 E3M3/day on the fifth month of production (the average of production was 1.21 E3M3/day flowing over the first five months of production).

Conclusion

In summary, the lab and field test data showed that substantially lower quantities of water can be used to create fracturing compositions that in combination with novel mixing and pumping methods are effective in providing high mass proppant fractures. Importantly, the subject technologies demonstrate that the use of mists can be used as an effective fracturing composition particularly having regard to the ability of a mist to transport an effective volume of proppant into the formation using conventional fracturing equipment. As a result, the subject technologies provide an effective economic solution to using high concentration gas fracturing compositions that can be produced in a continuous (i.e. non-batch) process without the attendant capital and operating costs of current pure gas fracturing equipment.

In addition, the results show that effective green, non-toxic, environmentally friendly, CBM friendly fracturing fluid compositions can be formulated and utilized in both deep and shallow wells.

The invention claimed is:

1. A method of fracturing a coal bed methane formation from a well comprising the steps of:
   a. preparing a non-toxic and coal bed methane friendly liquid component at surface in a blender, the liquid component including:
      i. a viscosified water component having a viscosity sufficient to temporarily support proppant admixed within the viscosified water component; and,
      ii. a breaker for relaxing the viscosity of the viscosified water component within a pre-determined period;
   b. testing the non-toxic and coal bed methane friendly liquid component to verify non-toxicity;
   c. mixing the proppant into the liquid component in the blender;
   d. introducing the proppant/liquid component into a high pressure pump and increasing the pressure to well pressure;
   e. introducing a gas component into the high pressure pump and increasing the pressure to well pressure;
   f. mix the gas component with the proppant/liquid component under high turbulence conditions; and
   g. pumping the combined gas and fluid from step f) at a high rate down the well,
   wherein the combined gas and fluid in step g) is characterized as a mist or slug at the formation.

2. A method as in claim 1 wherein the gas component is carbon dioxide or nitrogen or a mixture of carbon dioxide and nitrogen.

3. A method as in claim 1 wherein the combined gas and fluid in step f) is 3-15 vol % liquid component and 85-97 vol % gas component exclusive of the proppant.

4. A method as in claim 1 wherein the pre-determined period is less than 30 minutes.

5. A method as in claim 1 wherein the pre-determined period is less than 10 minutes.

6. A method as in claim 1 wherein the initial viscosity of the viscosified water component is 15-100 centipoise (cP) at 170 $sec^{-1}$ (20 °C) prior to mixing with proppant or gas component.

7. A method as in claim 1 wherein the mass of proppant mixed in step c) is 1.0-5.0 times the mass of the liquid component.

8. A method as in claim 1 wherein the concentration of breaker within the liquid component is sufficient to relax the initial viscosity of the liquid component to less than 10 cp at 170 $sec^{-1}$ (20 °C) within 30 minutes.

9. A method as in claim 1 wherein the concentration of breaker within the liquid component is sufficient to relax the initial viscosity of the liquid component to less than 10 cp at 170 $sec^{-1}$ (20 °C) within 10 minutes.

10. A method as in claim 1 wherein the viscosified liquid component includes 0.1 to 2.0 wt % gelling agent.

11. A method as in claim 10 wherein the liquid component is prepared in step a) by mixing the gelling agent and liquid component in a hydration unit.

12. A method as in claim 10 wherein the gelling agent is hydroxyethyl cellulose (HEC) or a derivative thereof.

13. A method as in claim 10 wherein the gelling agent is PAC (poly anionic cellulose) or a derivative thereof.

14. A method as in claim 1 wherein the breaker is hemicellulase enzyme.

15. A method as in claim 1 further comprising the step of mixing less than 1 vol % buffer with the liquid component.

16. A method as in claim 15 wherein the buffer is an organic acid.

17. A method as in claim 16 wherein the organic acid is formic acid.

18. A method as in claim 1 further comprising the step of mixing less than 1 vol % clay control agent with the viscosified liquid component.

19. A method as in claim 1 wherein proppant is partially supported within the liquid component at surface by turbulence.

20. A method as in claim 1 wherein the process is continuous.

21. A method as in claim 1 wherein the well injection of high ratio proppant slurry is preceded by a 100% gas pad.

22. A method of preparing a non-toxic fracturing fluid composition and fracturing a coal bed methane formation from a well comprising the steps of:
   a. preparing a non-toxic and coal bed methane friendly liquid test component at surface in a blender, the liquid component including:
      i. a viscosified water component having a viscosity sufficient to temporarily support proppant admixed within the viscosified water component; and,
      ii. a breaker for relaxing the viscosity of the viscosified water component within a pre-determined period;
   b. subjecting the test component to toxicity testing to verify non-toxicity;
   c. preparing a field-size liquid component based on the test component at surface in a field-size blender;
   d. mixing the proppant into the liquid component in the field-size blender;
   e. introducing the proppant/liquid component into a high pressure pump and increasing the pressure to well pressure;
   f. introducing a gas component into the high pressure pump and increasing the pressure to well pressure
   g. mix the gas component with the proppant/liquid component under high turbulence conditions; and
   h. pumping the combined gas and fluid from step g) at a high rate down the well.

* * * * *